United States Patent [19]

Sakai et al.

[11] 4,399,207
[45] Aug. 16, 1983

[54] ELECTROPHOTOGRAPHIC PHOTOSENSITIVE MEMBER WITH HYDRAZONE COMPOUND

[75] Inventors: Kiyoshi Sakai, Mitaka; Minoru Mabuchi, Tokyo; Shozo Ishikawa, Sayama; Makoto Kitahara, Yokohamo, all of Japan

[73] Assignee: Canon Kabushiki Kaisha, Tokyo, Japan

[21] Appl. No.: 400,685

[22] Filed: Jul. 22, 1982

[30] Foreign Application Priority Data

Jul. 31, 1981 [JP] Japan .................. 56-120454
Aug. 6, 1981 [JP] Japan .................. 56-123315

[51] Int. Cl.³ .................. G03G 5/06; G03G 5/14
[52] U.S. Cl. .................. 430/58; 430/59; 430/76; 430/77; 430/78; 564/250; 564/251
[58] Field of Search .................. 430/58, 59, 76, 77, 430/78; 564/250, 251

[56] References Cited

U.S. PATENT DOCUMENTS

| | | |
|---|---|---|
| 3,378,554 | 4/1968 | Pushchel et al. . |
| 3,837,851 | 3/1975 | Shattuck et al. . |
| 4,150,987 | 4/1979 | Anderson et al. . |
| 4,256,821 | 3/1981 | Enomoto et al. . |
| 4,278,747 | 7/1981 | Murayama et al. .... 4,297,426/Sakai et al. |
| 4,338,388 | 7/1982 | Sakai et al. .................. 430/59 |
| 4,362,798 | 12/1982 | Anderson et al. .................. 430/59 |

FOREIGN PATENT DOCUMENTS 56-155948 12/1981 Japan .
56-155949 12/1981 Japan .
930988 7/1963 United Kingdom .

*Primary Examiner*—Roland E. Martin, Jr.
*Attorney, Agent, or Firm*—Fitzpatrick, Cella, Harper & Scinto

[57] ABSTRACT

An electrophotographic photosensitive member having a layer containing at least one compound represented by the formula

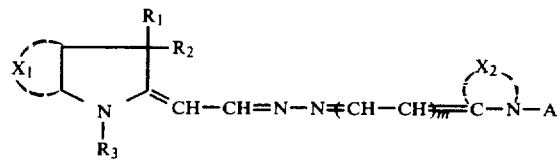

wherein $X_1$ represents a residue necessary for completing a substituted or unsubstituted aromatic hydrocarbon ring; $X_2$ represents a residue necessary for completing a substituted or unsubstituted heterocyclic ring; $R_1$, $R_2$, $R_3$, and A each represent hydrogen, alkyl, aralkyl, or aryl, substituted or unsubstituted; and m is 0 or 1.

16 Claims, No Drawings

ELECTROPHOTOGRAPHIC PHOTOSENSITIVE MEMBER WITH HYDRAZONE COMPOUND

BACKGROUND OF THE INVENTION

1. Field of the Invention

This invention relates to electrophotographic photosensitive members and more particularly to an electrophotographic photosensitive member having a photosensitive layer containing a novel organic photoconductive material selected from a series of hydrazone compounds.

2. Description of the Prior Art

There have so far been known inorganic photoconductive materials such as selenium, cadmium sulfide, zinc oxide, etc. as photoconductive materials used for electrophotographic photosensitive members. In contrast to their many advantages, for instance, chargeability to a suitable potential in a dark place, slight dissipation in a dark place, and capability of dissipating rapidly charge by light irradiation, these photoconductive materials have various disadvantages, for example, as follows: in the case of selenium type photosensitive members, the crystallization of the photoconductive materials readily proceeds under the influence of surrounding factors such as temperature, moisture, dust, and pressure, in particular remarkably when the surrounding temperature exceeds 40° C., thus resulting in lowering of chargeability or white spots in image. In the case of these photosensitive members and cadmium sulfide type photosensitive members, stable sensitivity and durability cannot be obtained in repeated operations under high humidity conditions. In the case of zinc oxide type photosensitive members, which require sensitization by a sensitizing pigment, Rose Bengal being a typical sensitizing pigment, stable images over a long period of time cannot be obtained, since the sensitizing pigment tends to cause charge deterioration by corona discharge and light fading by exposure to light.

On the other hand, various kinds of organic photoconductive polymers have been proposed the first of which was polyvinylcarbozole. However, although excellent in film forming properly, in lightness, and in some other points as compared with said inorganic photoconductive materials, these polymers have until now failed to be put to practical use, by reason that they are still unsatisfactory in film forming property and inferior to the inorganic photoconductive materials in sensitivity, durability, and stability to changes in environmental conditions.

There have been also proposed low-molecular organic photoconductive materials such as hydrazone compounds disclosed in U.S. Pat. No. 4,150,987, triarylpyrazoline compounds in U.S. Pat. No. 3,837,851, 9-styrylanthracene compounds in Japanese Patent Kokai Nos. 94828/1976 and 94829/1976, and 4-chlorooxazole compounds in Japanese Patent Kokai No. 53278/1980. These low-molecular organic photoconductive materials are unsatisfactory in sensitivity, although it has become possible by proper selection of a binder used to eliminate therefrom the disadvantage of lacking the film-forming property, which has been a problem in organic photoconductive polymers.

SUMMARY OF THE INVENTION

An object of this invention is to provide a novel electrophotographic photosensitive member free from the foregoing defects or disadvantages.

Another object of this invention is to provide a novel organic photoconductive material.

A further object of this invention is to provide a chage-transporting compound suitable for use in a photosensitive layer comprising laminated charge generation and charge transport layers.

These objects of this invention can be achieved with an electrophotographic photosensitive member having a layer containing at least one hydrazone compound represented by the formula

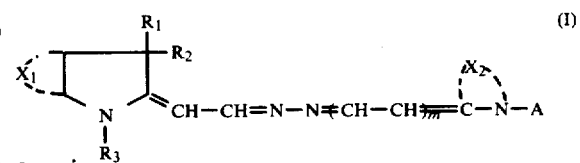

wherein $X_1$ represents a residue necessary for completing a substituted or unsubstituted aromatic hydrocarbon ring; $X_2$ represents a residue necessary for completing a substituted or unsubstituted heterocyclic ring; $R_1$, $R_2$, $R_3$, and A each represent hydrogen, alkyl, aralkyl, or aryl, substituted or unsubstituted; and m is 0 or 1.

DETAILED DESCRIPTION OF THE INVENTION

The photoconductive material in particular charge-transporting material used in this invention is represented by the formula (I)

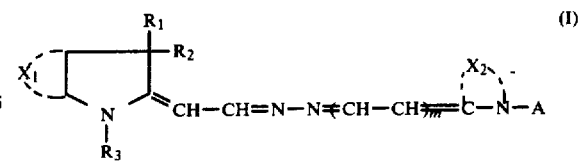

wherein $X_1$ represents a residue necessary for completing a substituted or unsubstituted aromatic hydrocarbon ring; $X_2$ represents a residue necessary for completing a substituted or unsubstituted heterocyclic ring; $R_1$, $R_2$, $R_3$, and A each represent hydrogen or alkyl, aralkyl, or aryl, substituted or unsubstituted; and m is 0 or 1.

In preferred embodiments of this invention, the photoconductive material or charge-transporting material can be represented by the following formula (1) or (2):

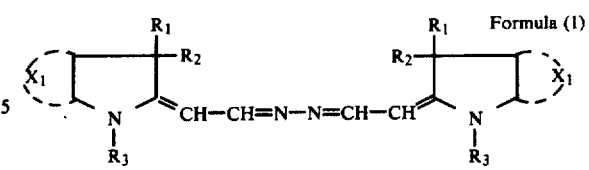

Formula (1)

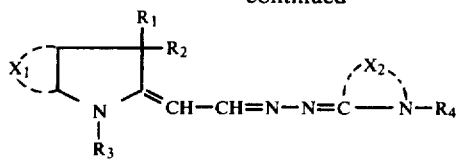

Formula (2)

Symbols in these formulae are as follows: $X_1$ represents a residue necessary for completing an aromatic hydrocarbon ring such as benzene ring, naphthene ring, or anthracene ring. $X_2$ represents a residue necessary for completing a heterocyclic ring such as a ring of thiazoline, thiazole, benzothiazole, naphthothiazole, oxazoline, oxazole, benzoxazole, naphthoxazole, or quinoline. These aromatic hydrocarbon rings and heterocyclic rings may also be substituted by halogen such as chlorine, bromine, or iodine; alkyl such as methyl, ethyl, propyl, butyl, or amyl; aralkyl such as benzyl, phenethyl, α-naphthylmethyl, or β-naphthylmethyl; alkoxy such as methoxy, ethoxy, propoxy, or butoxy; dialkylamino such as dimethylamino, diethylamino, dipropylamino, or dibutylamino; diarylamino such as diphenylamino, ditolylamino, or dixylylamino; diaralkylamino such as dibenzylamino or diphenethylamino; cyclic amino such as morpholino, pyrrolidinyl, or piperidino; acyl such as acetyl, propionyl, butyryl, benzoyl, or toluoyl; and aryl such as phenyl, tolyl, or xylyl. $R_1$, $R_2$, $R_3$, and $R_4$ represent hydrogen; substituted or unsubstituted alkyl such as methyl, ethyl, propyl, butyl, 2-hydroxyethyl, 2-chloroethyl, 2-methoxyethyl, 3-methoxypropyl, 2-ethoxyethyl, or 3-ethoxypropyl; substituted or unsubstituted aralkyl such as benzyl, phenethyl, chlorobenzyl, dichlorobenzyl, trichlorobenzyl, methylbenzyl, methoxybenzyl, dimethoxybenzyl, dimethylaminobenzyl, diethylaminobenzyl, α-naphthylmethyl, or β-naphthylmethyl; or substituted or unsubstituted aryl such as phenyl, tolyl, xylyl, biphenyl, methoxyphenyl, dimethoxyphenyl, ethoxyphenyl, chlorophenyl, dichlorophenyl, trichlorophenyl, dimethylaminophenyl, diethylaminophenyl, dipropylaminophenyl, morpholinophenyl, piperidinophenyl, cyanophenyl, hydroxyphenyl, carboxyphenyl, α-naphthyl, or β-naphthyl.

Examples of hydrazone compounds represented by formula (1) are listed below.

| Compound No. | |
|---|---|
| $H_1$-(1) | 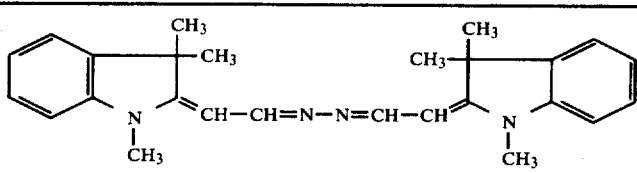 |
| $H_1$-(2) | 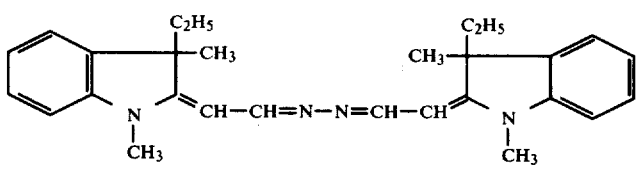 |
| $H_1$-(3) | 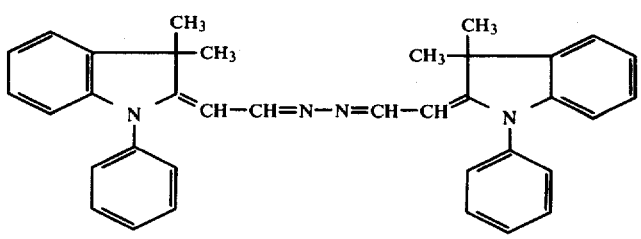 |
| $H_1$-(4) | 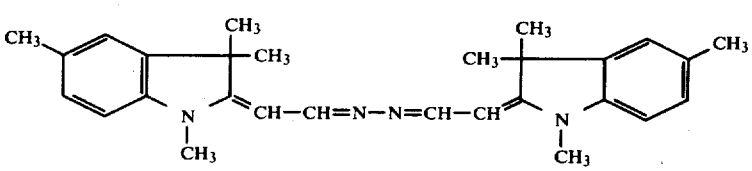 |
| $H_1$-(5) | 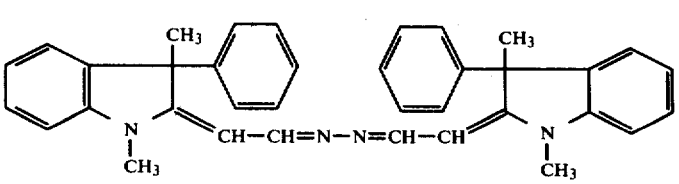 |

| Compound No. | |
|---|---|
| H₁-(6) | 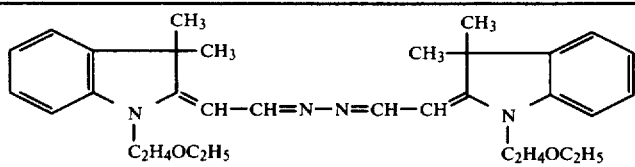 |
| H₁-(7) | 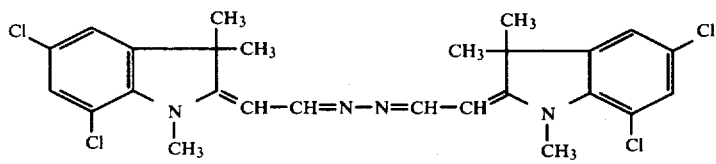 |
| H₁-(8) | 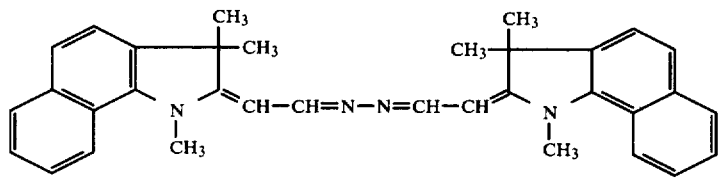 |
| H₁-(9) | 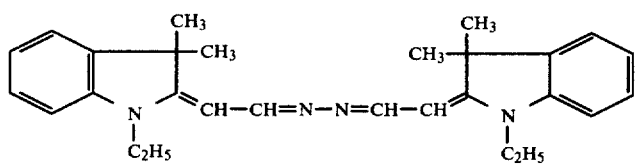 |
| H₁-(10) | 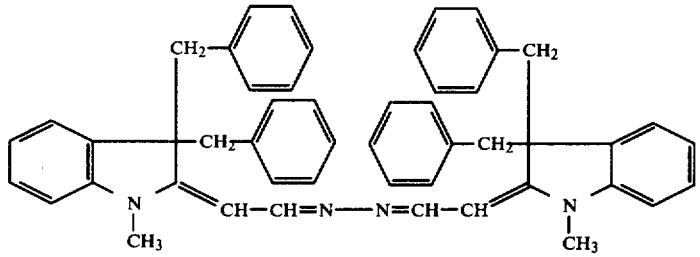 |
| H₁-(11) | 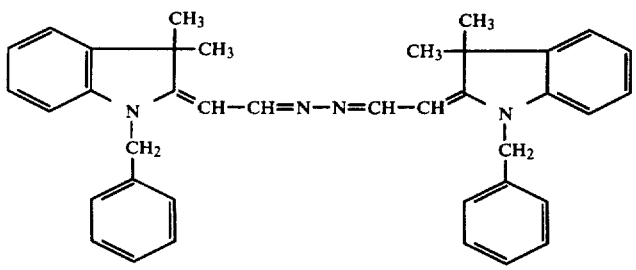 |
| H₁-(12) | 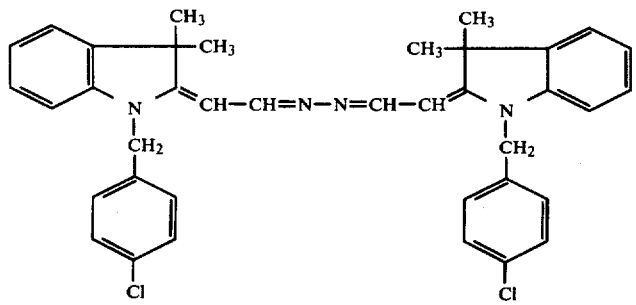 |
These compounds can be used singly or in combination of two or more.

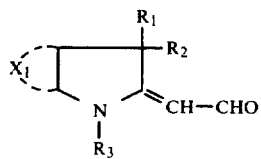
(3)
wherein $X_1$, $R_1$, $R_2$, and $R_3$ each are as defined above.
Examples of hydrazone compounds represented by formula (2) are listed below.
| Compound No. | |
|---|---|
| H₂-(1) | 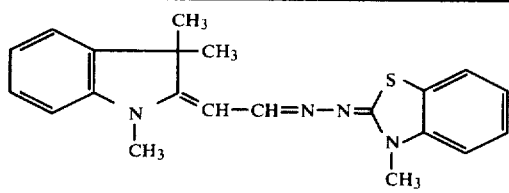 |
| H₂-(2) | 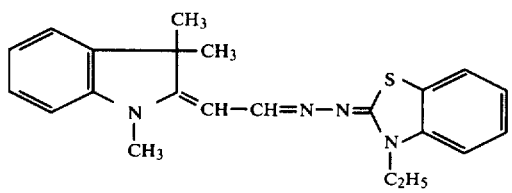 |
| H₂-(3) | 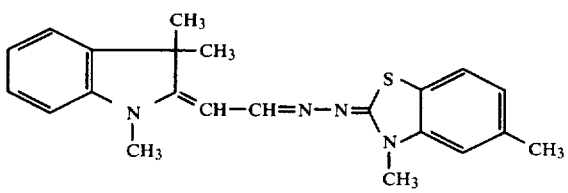 |
| H₂-(4) | 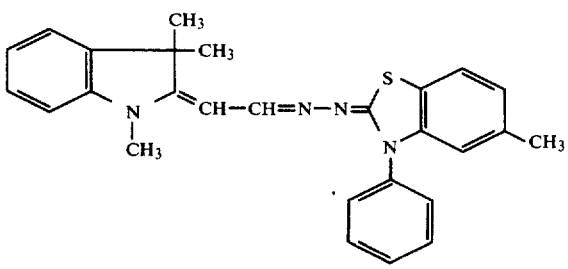 |
| H₂-(5) | 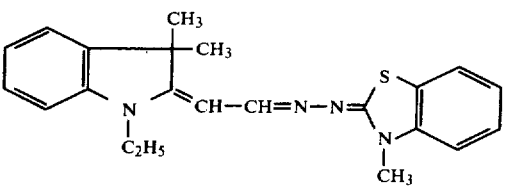 |
| H₂-(6) | 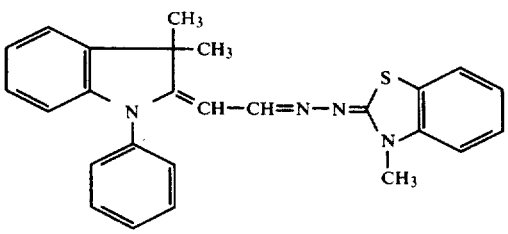 |

-continued
| Compound No. | |
|---|---|
| H₂-(7) | 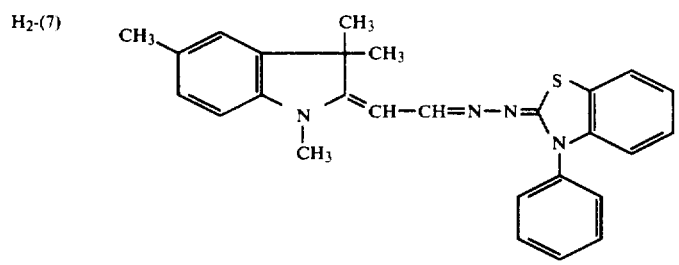 |
| H₂-(8) | 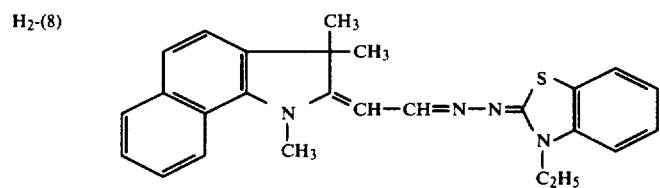 |
| H₂-(9) | 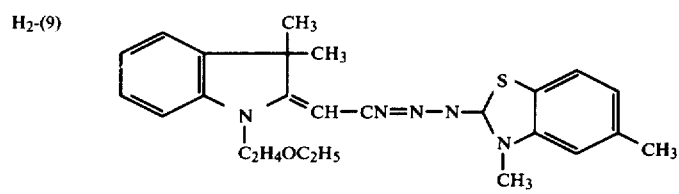 |
| H₂-(10) | 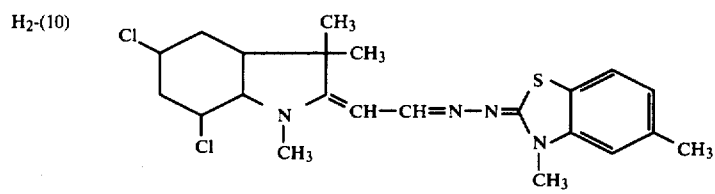 |
| H₂-(11) | 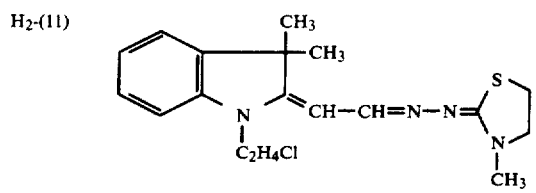 |
| H₂-(12) | 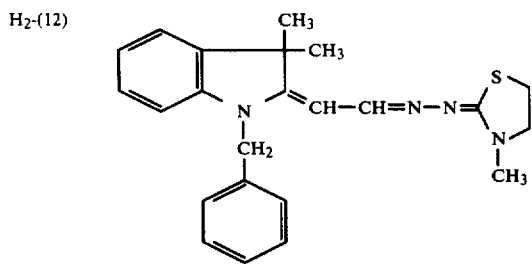 |
| H₂-(13) | 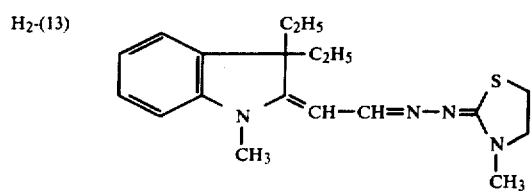 |

-continued
| Compound No. | |
|---|---|
| H₂-(14) | 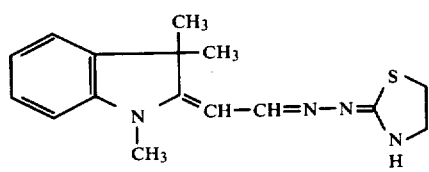 |
| H₂-(15) | 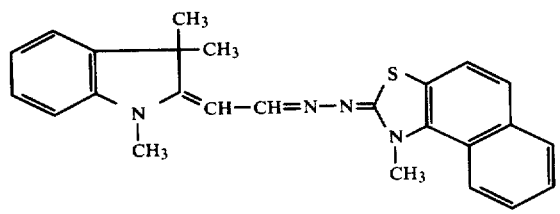 |
| H₂-(16) | 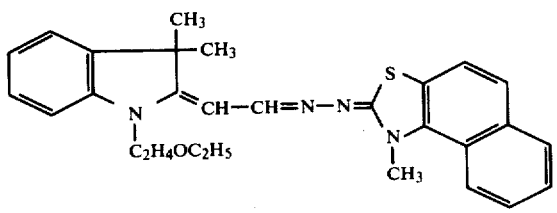 |
| H₂-(17) | 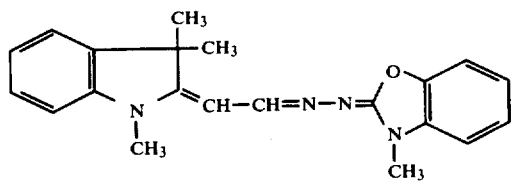 |
| H₂-(18) | 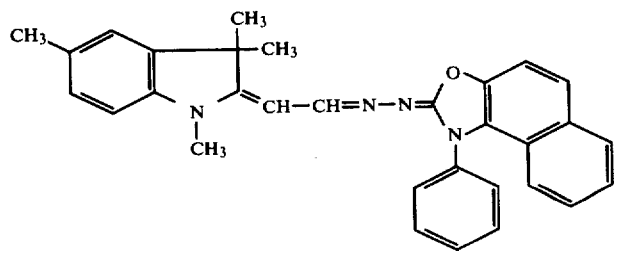 |
| H₂-(19) | 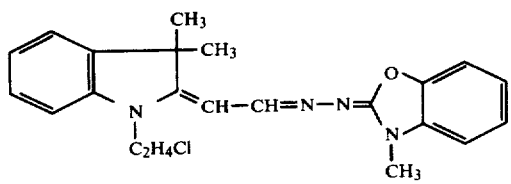 |
| H₂-(20) | 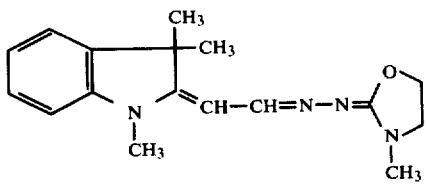 |

| Compound No. | |
|---|---|
| H₂-(21) | 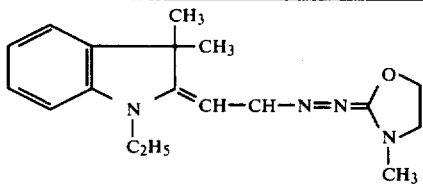 |
| H₂-(22) | 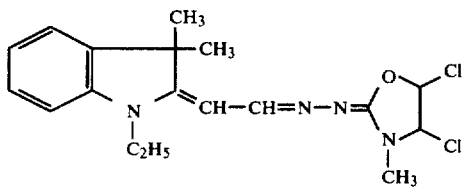 |
| H₂-(23) | 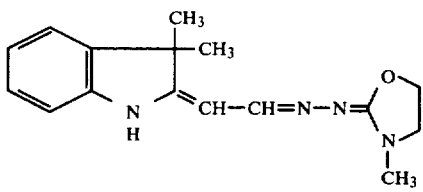 |
| H₂-(24) | 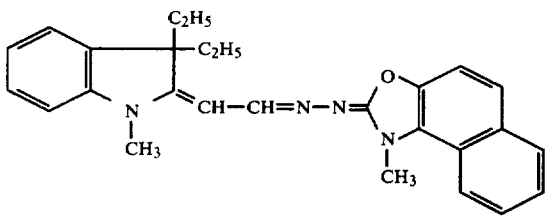 |
| H₂-(25) | 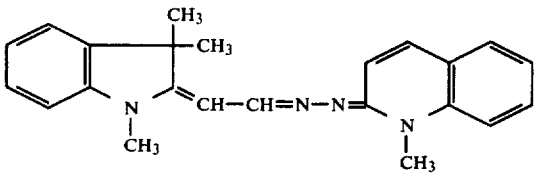 |
| H₂-(26) | 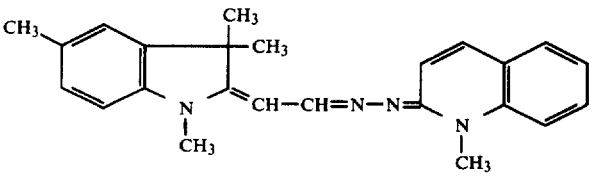 |
| H₂-(27) | 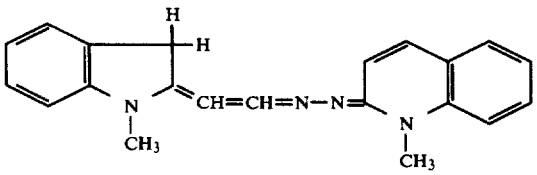 |

These compounds also can be used singly or in combination of two or more.

Hydrazone compounds represented by formula (2) can be readily prepared by the ordinary method from aldehydes represented by the foregoing formula (3) and hydrazines represented by the formula

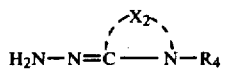  (4)

wherein $R_4$ and $X_2$ each are as defined above.

A detailed description will be given on the method for the preparation of hydrazone compounds used in this invention, by the following Preparation Examples:

PREPARATION EXAMPLE 1

(Preparation of compound $H_1$-(1) listed above)

An aldehyde (10.00 g, 0.050 mole) of formula (3) wherein $X_1$ is the residue necessary for completing the benzene ring and $R_1$, $R_2$, and $R_3$ each are methyl was dessolved in a mixture of ethanol (100 ml) and acetic acid (20 ml) in a 300-ml three-necked flask. A solution of hydrazine hydrate (80% solution, 1.57 g, 0.025 mole) in ethanol (20 ml) was added dropwise to the above solution and the mixture was reacted at room temperature for 30 minutes with stirring. Then, the reaction mixture was poured into water (3 l) and neutralized with sodium carbonate. The resulting precipitate was filtered, dried, and repeatedly recrystallized from acetone, giving yellow needle-like crystals (3.69 g, 37% yield based on the aldehyde), m.p. 198.0°-199.0° C.

Anal. Calcd. for $C_{26}H_{30}N_4$: C, 78.34%; H, 7.60%; N, 14.06%; Found: C, 78.24%; H, 7.66%; N, 14.01%.

PREPARATION EXAMPLE 2

(Preparation of compound $H_2$-(1) listed above)

An aldehyde (4.31 g, 0.021 mole) of formula (3) wherein $X_1$ is the residue for completing the benzene ring and $R_1$, $R_2$, and $R_3$ each are methyl was reacted with a hydrazine of formula (4) wherein $X_2$ is the residue for completing the benzothiazole ring and $R_4$ is methyl, after addition of ethanol (30 ml) and acetic acid (2 ml), in a 200-ml three-necked flask at 60° C. for 30 minutes. Then, the reaction mixture was poured into water (4 l) and neutralized with sodium carbonate. The resulting precipitate was filtered, washed with water, dried, and repeatedly recrystallized from acetone, giving yellow crystals (3.42 g, 45% yield based on the aldehyde), m.p. 157.0°-159.0° C.

Anal. Calcd. for $C_{21}H_{22}N_4S$: C, 69.57%; H, 6.13%; N, 15.46%; Found: C, 69.48%; H, 6.20%; N, 15.43%.

Other hydrazone compounds used in this invention can also be prepared similarly.

The hydrazone compound of formula (I) can be used in any type of electrophotographic photosensitive member using organic photoconductive materials, but preferably in the following types and the like:

(1) A type comprising a charge-transfer complex formed by combining an electron donative substance and an electron attractive substance.

(2) A type having an organic photoconductive material sensitized by addition of a dye.

(3) A type comprising a dispersion of pigment in a hole matrix.

(4) A type comprising a charge generation layer and a charge transport layer both sharing functions separately.

(5) A type comprising an organic photoconductive material and a co-crystalline complex of dye and resin, as main components.

(6) A type comprising a charge-transfer complex containing an organic or inorganic charge-generating material.

Of these types, (3) to (6) are particularly preferred. Moreover, when the hydrazone compound of formula (I) is used in the type (4) of photosensitive member, viz. when it is used as a charge-transporting material of charge transport layer in a photosensitive member having two layers of chage generation and charge transport both sharing functions separately, the prepared photosensitive member will have an improved sensitivity as well as exhibit a low residual potential, in particular. In this case, the reduction of sensitivity and the rise of residual potential in repeated survice operations can be suppressed to extents negligible for practical applications. Accordingly, referring now to the type (4) of photosensitive member, detailed description is given.

It is essential that this type of photosensitive member has a layer construction of conductive layer, charge generation layer, and charge transport layer. While the charge generation layer may be either on the upper or lower side of the charge transport layer, a type of photosensitive member for repeated uses is preferred to have a layer construction laminated in order of conductive layer, charge generation layer, and charge transport layer from bottom to top, mainly in view of the mechanical strength and in certain cases in view of the chargeability. A bond layer can be laid between the conductive layer and the charge generation layer, if necessary, for the purpose of improving the adhesion between them.

The charge transport layer used in this invention is preferably formed by coating a solution of the hydrazone compound of formula (I) and a binder in a suitable solvent, and by drying it. The binders used herein include resins such as polysulfone, acrylic resins, methacrylic resins, vinyl chloride resin, vinyl acetate resin, phenolic resins, epoxy resins, polyester resins, alkyd resins, polycarbonates, polyurethanes, and copolymers containing two or more kinds of repeating units of these resins. Among these, polyester resins and polycarbonates are particularly preferable. Photoconductive polymers like poly(N-vinylcarbazole) having a charge transporting capability themselves can also be used as the binder.

Suitable compounding ratios of the binder to the charge-transporting compound are 10-500:100 by weight. Thickness of the charge transport layer is generally 2-100μ, preferably 5-30μ. The charge transport layer can be formed by usual coating methods including blade coating, Meyer bar coating, spray coating, dip coating, bead coating, air knife coating, and curtain coating.

A variety of organic solvents generally useful can be used for forming the charge transport layer of this invention. Typical examples of these solvents include aromatic hydrocarbons or halogenated derivatives such as benzene, toluene, xylene, mesitylene, and chlorobenzene; ketones such as acetone and 2-butanone; halogenated aliphatic hydrocarbons such as methylene chloride, chloroform, and ethylene chloride; cyclic or linear ethers such as tetrahydrofuran and ethyl ether; and mixtures of these solvents.

Various additives can be incorporated in the charge transport layer of this invention. Such additives are, for example, diphenyl, chlorinated diphenyl, o-terphenyl, p-terphenyl, dibutyl phthalate, dimethylglycol phthalate, dioctyl phthalate, triphenyl phosphate, methylnaphthalene, benzophenone, chlorinated paraffin, dilauryl thiodipropionate, 3,5-dintrosalicylic acid, various fluorocarbons, silicone oil, silicone rubber, and phenolic compounds such as dibutylhydroxytoluene, 2,2'-methylene-bis(6-t-butyl-4-methylphenol), α-tocophenol, 2-t-octyl-5-chlorohydroquinone, and 2,5-di-t-octylhydroquinone.

For the charge generation layer, any charge-generating material can be used so far as it is capable of generating charge carriers with a high efficiency. Preferable materials for this purpose include inorganic substances such as selenium, selenium-tellurium, selenium-arsenic, cadmium sulfide, amorphous silicon, and the like; and organic substances such as pyrylium dyes, thiopyrylium dyes, triarylmethane dyes, thiazine dyes, cyanine dyes, phthalocyanine pigments, perylene pigments, indigo pigments, thioindigo pigments, quinacridone pigments, squaric acid pigments, azo pigments, polycyclic quinone pigments, and the like. Typical examples of charge-generating materials used in this invention are given as follows:

| Charge-generating material | |
|---|---|
| Amorphous silicon | (1) |
| Selenium-Tellurium | (2) |
| Selenium-Arsenic | (3) |

(4)
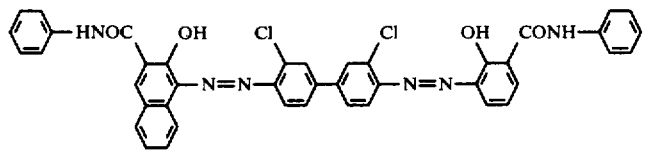

(5)
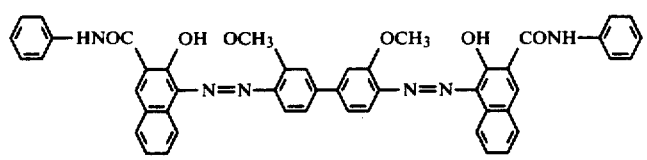

(6)
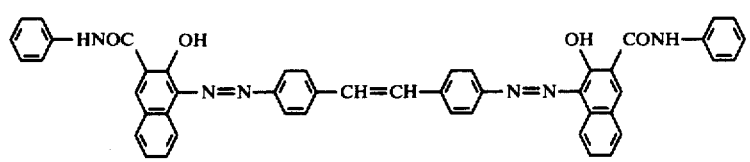

(7)
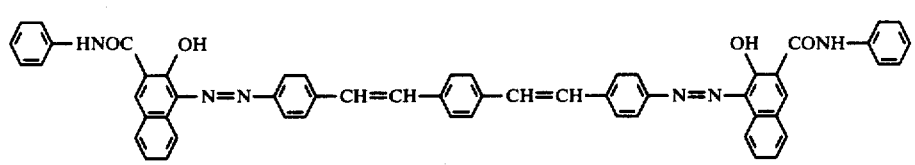

(8)
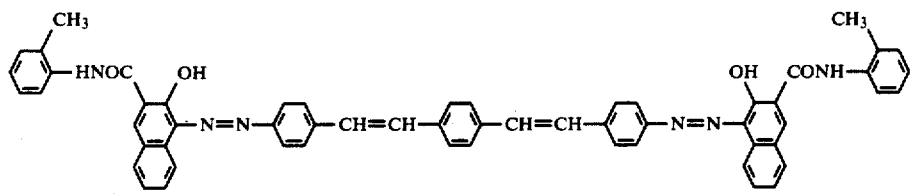

(9)
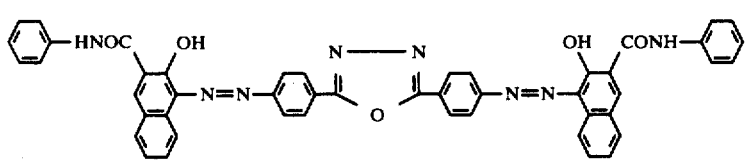

(10)
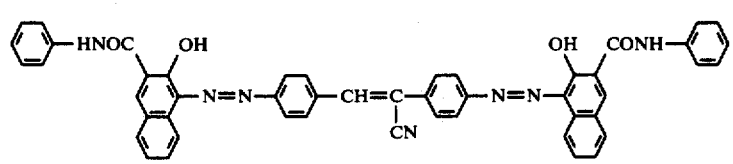

(11)
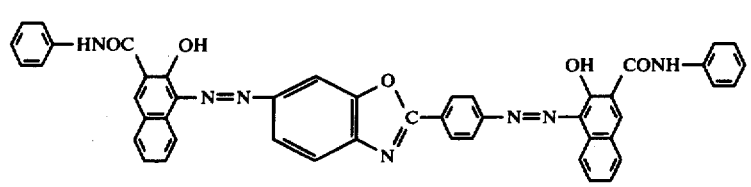

-continued
Charge-generating material
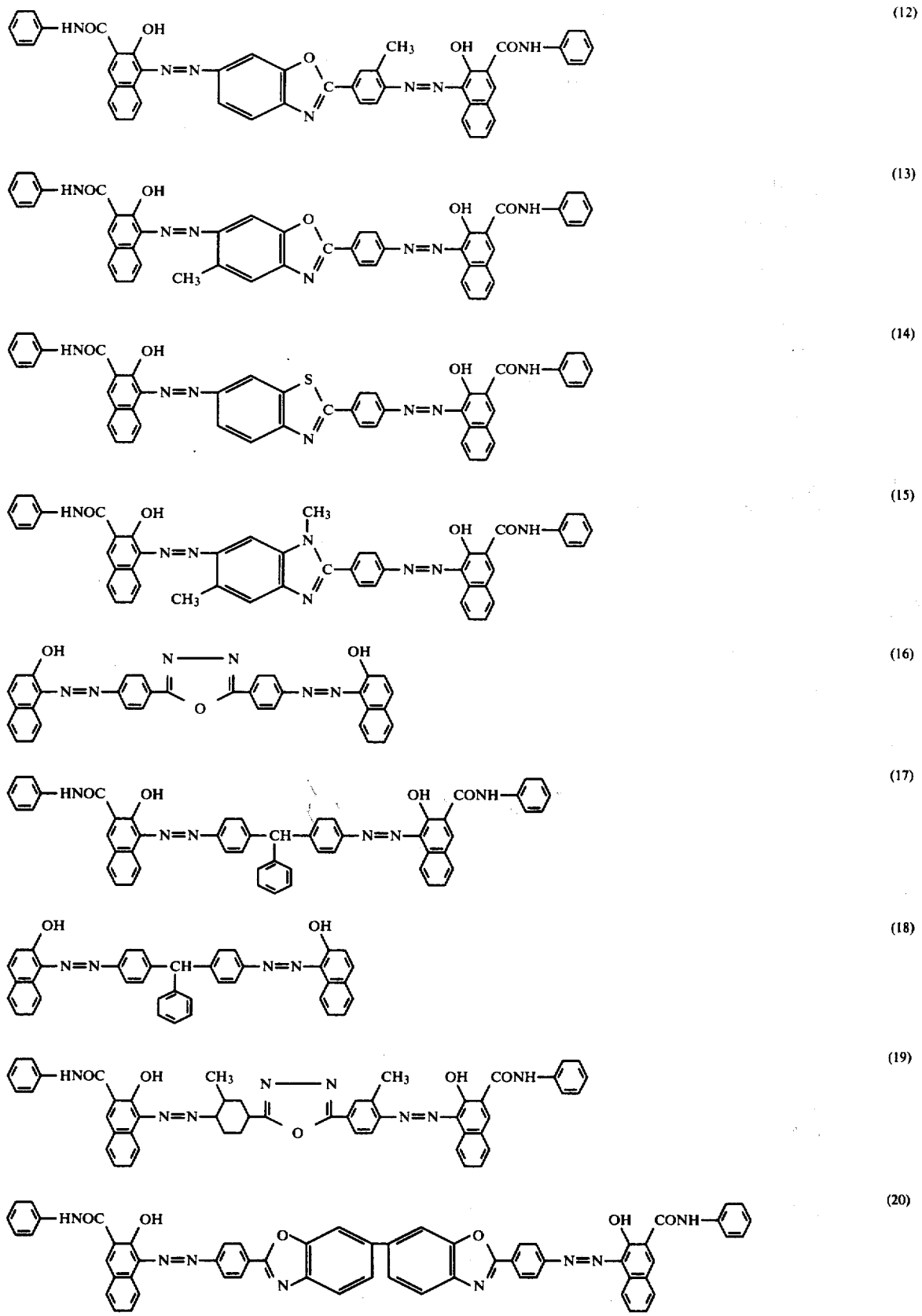

| Charge-generating material | |
|---|---|
| 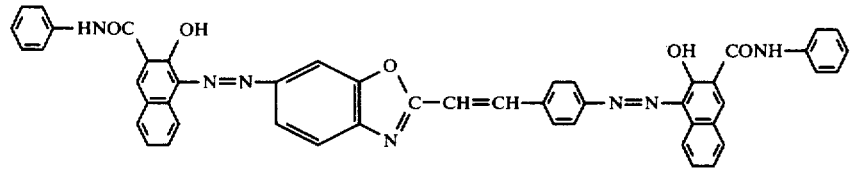 | (21) |
| 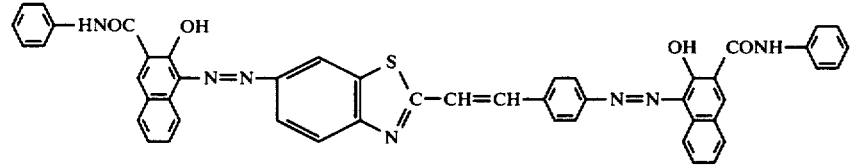 | (22) |
| 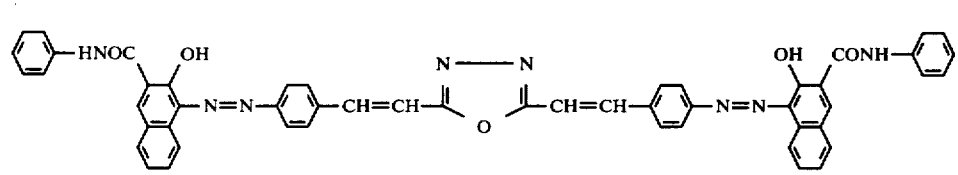 | (23) |
| 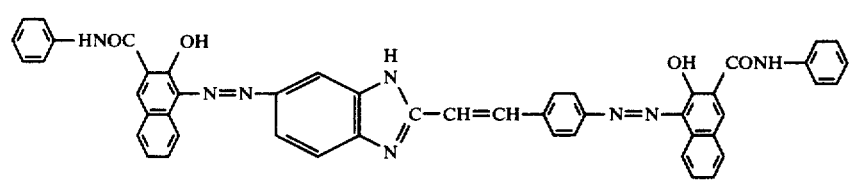 | (24) |
| 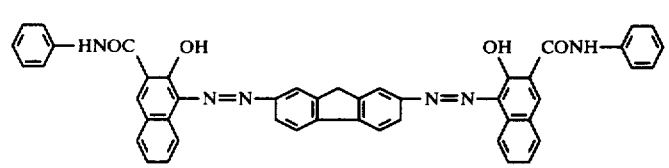 | (25) |
| 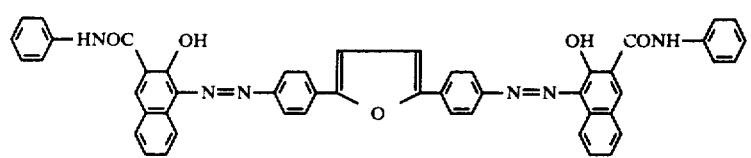 | (26) |
| 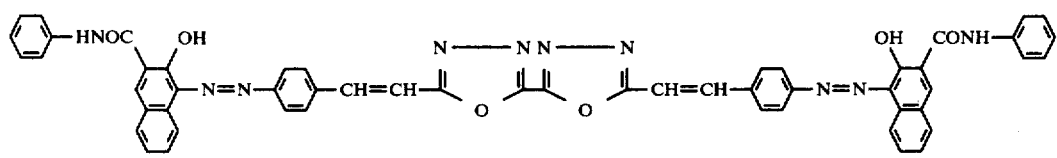 | (27) |
| 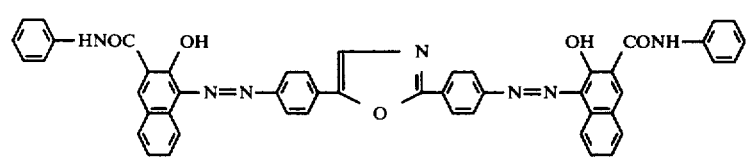 | (28) |
| 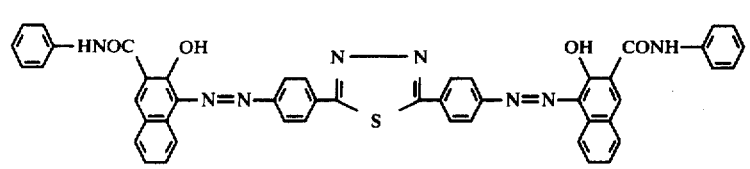 | (29) |

| Charge-generating material | |
|---|---|
| 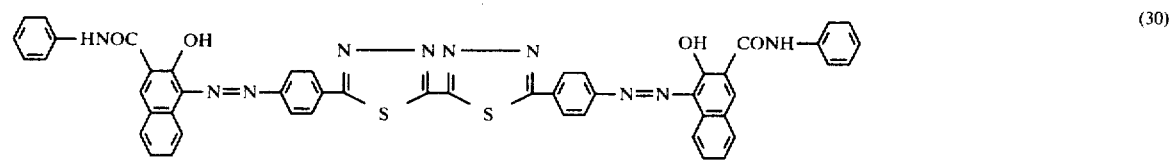 | (30) |
| 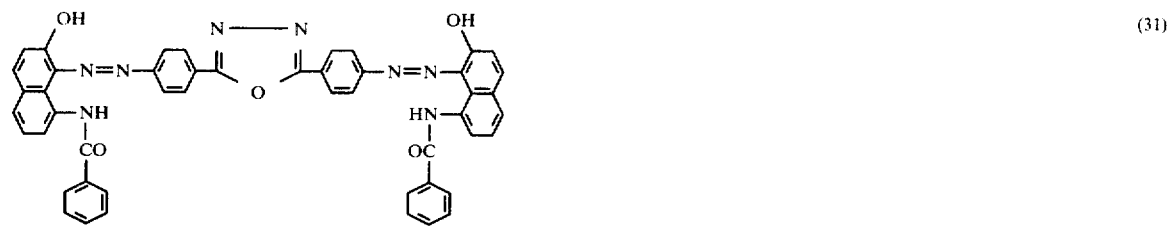 | (31) |
| 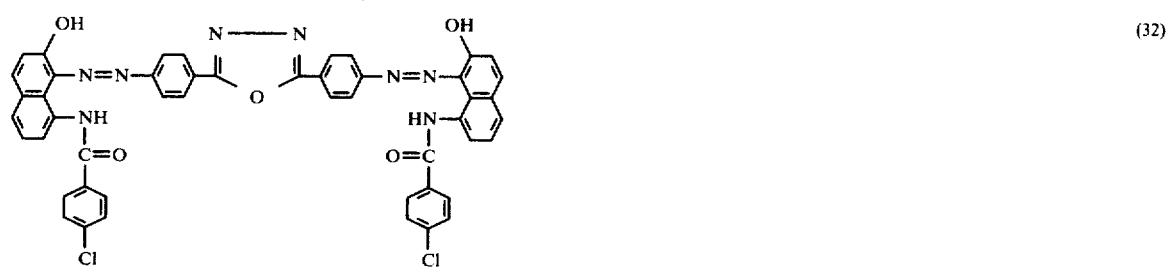 | (32) |
| 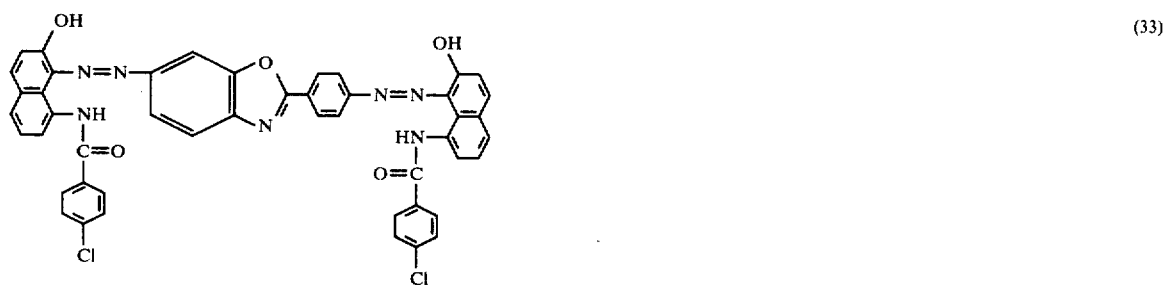 | (33) |
| 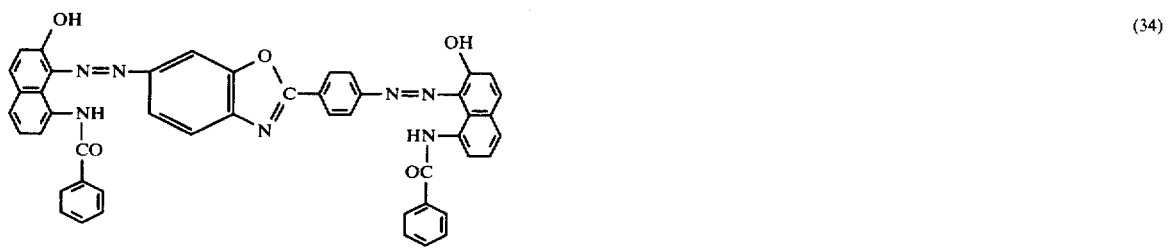 | (34) |
| 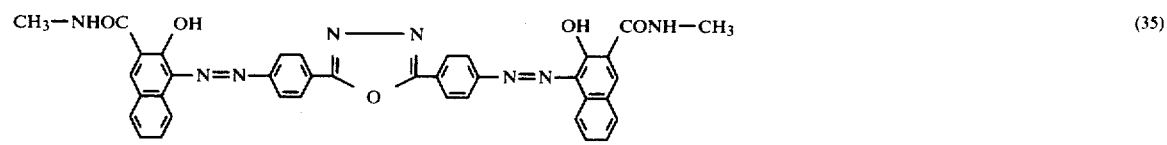 | (35) |
| 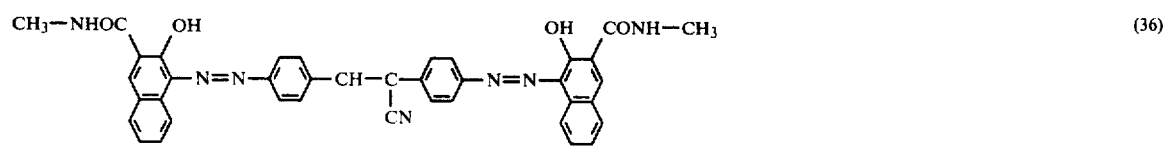 | (36) |

| Charge-generating material | |
|---|---|
| 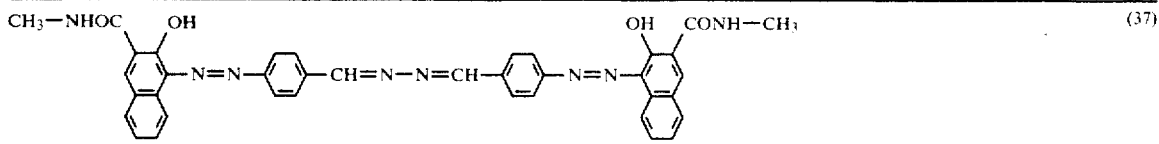 | (37) |
| 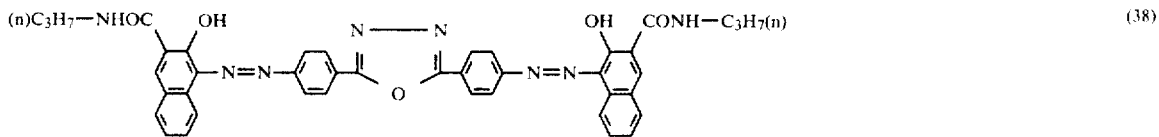 | (38) |
| 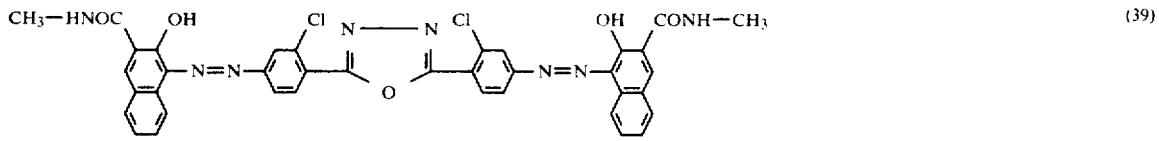 | (39) |
| Cadmium sulfide | (40) |
| α, β, γ, and x-Copper phthalocyanine | (41) |

The above-cited pigments can be used singly or in combination of two or more.

The electrophotographic photosensitive member of this invention can be prepared by coating a suitable substrate with a charge generation layer containing the above-cited pigment, and overlaying the charge generation layer with a charge transport layer. In this type of photosensitive member, an intermediate layer or bond layer may also be formed between the substrate and the charge generation layer. This intermediate layer acts to prevent the injection of free charges from the conductive substrate into the photosensitive layers of laminate construction upon charging the layers, and serves at the same time as a bond layer for holding the photosensitive layers together with the conductive substrate in a single body. This intermediate layer is formed from a metal oxide such as aluminum oxide, polyethylene, polypropylene, acrylic resins, methacrylic resins, vinyl chloride resin, phenolic resins, epoxy resins, polyester resins, alkyd resins, polycarbonates, polyurethanes, polyimide resin, vinylidene chloride resin, vinyl chloride-vinyl acetate copolymer, casein, gelatin, poly(vinyl alcohol), nitrocellulose, water-soluble ethylene-acrylic acid copolymer, or the like. Thickness of the intermediate layer or bond layer is 0.1–5μ, preferably 0.5–3μ. The charge generation layer can be laid, alternatively, on the upper side of the charge transport layer. In this case, the former may be coated with a suitable protective layer.

The charge generation layer is formed by vacuum deposition, sputtering, glow discharge, or the usual coating method, depending upon the type of charge-generating material employed.

For the coating operation, a charge-generating material can be applied without a binder or with itself dispersed or dissolved in a binder solution.

For dispersing a charge-generating material pigment, known means such as ball mills, attritors, and the like are available, wherein particle sizes of the pigment are reduced to 5μ or less, preferably 2μ or less, and most preferably 0.5μ or less.

The pigment can also be applied in the form of solution in an amine group solvent such as ethylenediamine and the like.

For the coating, usual methods are employed such as blade coating, Meyer bar coating, spray coating, dip coating, and the like.

Thickness of the charge generation layer is generally up to 5μ, preferably 0.01–1μ.

Binders for dispersing said charge-generating compounds include poly(vinyl butyral), poly(methyl methacrylate), polyester, poly(vinylidene chloride), polyamides, chlorinated rubber, polyvinyltoluene, polystyrene, poly(vinyl chloride), ethylcellulose, polyvinylpyridine, styrene-maleic anhydride copolymer, etc. The content of such a binder based on the total weight of the charge generation layer is up to 80%, preferably up to 50%.

The surface of the charge generation layer may also be mirror-finished, if necessary, for the purpose of uniforming the carrier injection from this layer into the upper charge transport layer.

Since the hydrazone compound of this invention is of a hole-transporting nature, it is necessary to give negative charges to the charge transport layer surface in order to operate a photosensitive member comprising a conductive layer, charge generation layer, and charge transport layer laminated in this order wherein the hydrazone compound is employed as the charge-transporting material. On image exposure of the photosensitive member after negative charging, in the light-exposed areas holes produced in the charge generation layer are injected into the charge transport layer and then arrive the surface, where they neutralize negative charges to decay the surface potential, thus producing an electrostatic contrast between the light-exposed and light-unexposed areas. For visualizing this latent image, various development processes hitherto used are available.

Another embodiment of the electrophotographic photosensitive member of this invention is of a type prepared by overlaying a conductive layer with a photoconductive layer formed from a dispersion of the previous pigment in a charge-transporting medium comprising the hydrazone compound of this invention and an insulating binder-including the case where the binder itself is a charge-transporting material like poly(N-vinylcarbaazole). Insulating binders, for instance, disclosed in Japanese Patent Kokai Nos. 30328/1972 (U.S. Pat. No. 3,894,868) and 18545/1972 (U.S. Pat. No. 3,870,516) can be used in this purpose.

Substrates provided with conductivity can be used for the electrophotographic photosensitive member of this invention, that is, any type of conventional conductive layer may also be employed as the subrate. For example, may be cited sheets of metals such as aluminum, vanadium, molybdenum, chromium, cadmium, titanium, nickel, copper, zinc, palladium, indium, tin, platinum, gold, stainless steel, brass, and the like; and metallized or metal foil-overlaid plastic sheets.

The electrophotographic photosensitive member of this invention can be used not only in electrophotographic copying machines but also over a wide field of electrophotographic applications such as those to laser printers, CRT printers, and electrophotographic printing plate making systems.

The electrophotographic photosensitive member according to this invention has a markedly high sensitivity as compared with conventional ones and additionally it causes neither increase in light portion potential nor decrease in dark portion potential even when charge and light-exposure are repeated 10,000 times or more.

This invention will be illustrated in further detail referring to the following Examples:

EXAMPLE 1

A solution of casein in aqueous ammonia (casein 11.2 g, 28% aqueous ammonia 1 g, water 222 ml) was coated on an aluminum plate by means of a Meyer bar and dried to form a bond layer of coating weight 1.0 g/m².

A dispersion of 5 g of a disazo pigment having the structure

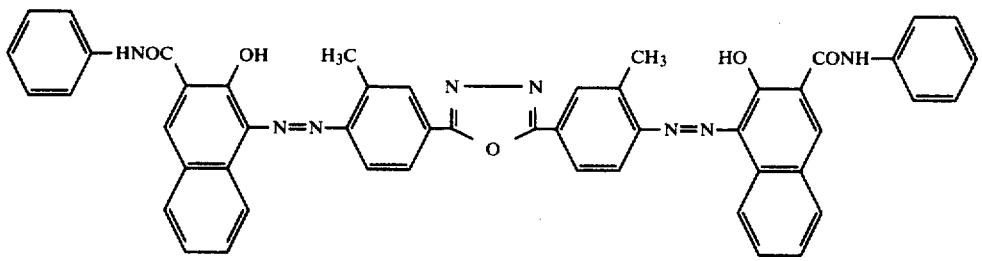

in a solution of 2 g of a butyral resin (degree of butyral conversion 63 mole %) in 95 ml of ethanol was coated on the bond layer to form a charge generation layer of coating weight 0.2 g/m² after drying.

A solution of 5 g of the above-cited hydrazone compound (H$_1$-(1)) and 5 g of a polycarbonate of bisphenol A (viscosity average mol. wt. about 30,000) in 150 ml of dichloromethane was coated on the charge generation and dried to form a charge transport layer of coating weight 10 g/m².

The electrophotographic photosensitive member thus prepared was corona-charged at ⊖5 KV in the static fashion by using an electrostatic copying paper testing machine (Model SP-428, mfd. by Kawaguchi Denki K.K.), retained for 10 seconds in the dark, and exposed to light at an intensity of 5 lux to examine its charge bearing characteristics.

The results were as follows, wherein Vo is the original potential (volt), Rv is the potential retention (%) after standing for 10 seconds in the dark, and E ½ is the exposure quantity for halving the original potential.

Vo: ⊖630 V, Rv: 93%, E ½: 5.1 lux.sec.

EXAMPLE 2

A photosensitive member was prepared and tested for charge bearing characteristics, in the same manner as in Example 1 except for using hydrazone compound (H$_2$-(1)) in place of hydrazone compound (H$_1$-(1)). The results were as follows:

Vo: ⊖520 V, Rv: 88%, E ½: 4.8 lux. sec.

EXAMPLES 3–25

The following pigment was vacuum-deposited on aluminum plates 100μ thick to form a charge generation layer 0.15μ thick on each plate.

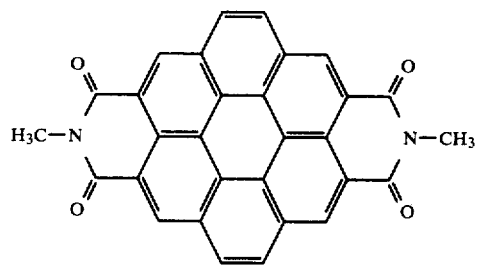

A solution of 5 g of a polyester resin (Vylon 200, mfd. by Toyo Spinning Co., Ltd.) and 5 g of each of the hydrazone compounds shown in Table 1 in 150 ml of dichloromethane was coated on each charge generation layer and dried to form a charge transport layer of coating weight 11 g/m².

The electrophotographic photosensitive members thus prepared were tested for charge bearing characteristics in the same manner as in example 1. The results are shown in Table 1.

TABLE 1

| Example No. | Compound No. | Vo (−V) | Rv (%) | E½ (lux. sec) |
|---|---|---|---|---|
| 3  | H$_1$-(2)  | 620 | 93 | 5.3 |
| 4  | H$_1$-(3)  | 650 | 94 | 5.8 |
| 5  | H$_1$-(4)  | 610 | 91 | 5.4 |
| 6  | H$_1$-(5)  | 640 | 93 | 5.7 |
| 7  | H$_1$-(6)  | 620 | 92 | 5.9 |
| 8  | H$_1$-(7)  | 630 | 92 | 6.2 |
| 9  | H$_1$-(8)  | 640 | 94 | 6.5 |
| 10 | H$_1$-(9)  | 610 | 91 | 5.4 |
| 11 | H$_1$-(10) | 660 | 94 | 6.8 |
| 12 | H$_2$-(2)  | 510 | 87 | 4.9 |
| 13 | H$_2$-(3)  | 500 | 87 | 5.0 |
| 14 | H$_2$-(4)  | 540 | 89 | 5.5 |
| 15 | H$_2$-(5)  | 500 | 86 | 4.8 |
| 16 | H$_2$-(6)  | 550 | 90 | 5.6 |
| 17 | H$_2$-(7)  | 530 | 89 | 5.4 |
| 18 | H$_2$-(8)  | 550 | 89 | 5.9 |
| 19 | H$_2$-(9)  | 520 | 88 | 5.7 |
| 20 | H$_2$-(10) | 530 | 87 | 6.2 |

TABLE 1-continued

| Example No. | Compound No. | Vo (−V) | Rv (%) | E½ (lux. sec) |
|---|---|---|---|---|
| 21 | H₂-(11) | 480 | 89 | 7.8 |
| 22 | H₂-(15) | 490 | 90 | 7.0 |
| 23 | H₂-(17) | 470 | 88 | 5.9 |
| 24 | H₂-(20) | 520 | 89 | 6.5 |
| 25 | H₂-(25) | 510 | 87 | 7.2 |

EXAMPLE 26

A 0.8-μ thick charge generation layer of selenium-tellurium (tellurium 10 wt%) was formed on an aluminum plate by vacuum deposition.

The same solution as used for the charge transport layer in Example 1 was coated on the charge generation layer and dried to form a charge transport layer of coating weight 11 g/m².

The photosensitive member thus prepared was tested for charge bearing characteristics in the same manner as in Example 1. The results were as follows:

Vo: ⊖670 V, Rv: 91%, E ½ 3.2 lux.sec.

EXAMPLE 27

A 0.8-μ thick charge generation layer of selenium-tellulium (tellurim 10 wt%) was formed on an aluminum plate by vacuum deposition.

The same solution as used for the charge transport layer in Example 2 was coated on the charge generation layer and dried to form a charge transport layer of coating weight 11 g/m².

The photosensitive member thus prepared was tested for charge bearing characteristics in the same manner as in Example 1. The results were as follows:

Vo: ⊖600 V, Rv: 86%, E ½: 3.4 lux.sec.

EXAMPLE 28

A dispersion was prepared by adding 1.0 g of β-type of copper phthalocyanine to a solution of 5 g of hydrazone compound (H₁-(1)), which was used in Example 1, and 5 g of a poly(N-vinylcarbazole) (mol.wt. about 300,000) in 150 ml of dichloromethane. The dispersion was coated on the casein layer formed in the same manner as in Example 1 on an aluminum plate and was dried to form a photosensitive layer of coating weight 10 g/m².

The photosensitive member prepared was tested for charge bearing characteristics in the same manner as in Example 1 except for charging it positively. The results were as follows:

Vo: ⊕550 V, Rv: 88%, E ½: 18.3 lux.sec.

EXAMPLE 29

A photosensitive member was prepared and tested, in the same manner as in Example 28 except for using hydrazone compound (H₂-(1)) in place of hydrazone compound (H₁-(1)). The results were as follows:

Vo: ⊕510 V, Rv: 78%, E ½: 17.8 lux.sec.

EXAMPLE 30

A 0.2 mm thick molybdenum plate (substrate) surface-cleaned was fixed on a prescribed position in a glow discharge-vacuum deposition chamber. The chamber was evacuated to about 5×10⁻⁶ Torr and a heater was turend on to raise and settle the substrate temperature to 150° C. Then, hydrogen gas and silane gas (15 vol% of the hydrogen gas) were introduced into the chamber and the chamber pressure was maintained at 0.5 Torr by regulating the gas flow and manipulating the main valve of the chamber. High-frequency (5 MHz) power was applied to an induction coil of the chamber to generate a glow discharge in an inner space, surrounded with the coil, of the chamber, where the input power was set to 30 W. These conditions were kept until amorphous silicon grew on the substrate to a thickness of 2μ. Then, the heater and the high-frequency power source were switched off and, after the substrate cooled to 100° C., the inflow of hydrogen and silane into the chamber was stopped. The chamber was once evacuated to 10⁻⁵ Torr or less, and allowed to recover atmospheric pressure to take out the substrate. Succeedingly, a charge transport layer was formed on the amorphous silicon layer in the same manner as in Example 1.

The photosensitive member thus prepared was set in a charging-exposing testing machine, corona-charged at ⊖6 KV, and exposed immediately thereafter to a pattern of light projected from a tungsten lamp through a transmission type of test chart. Also immediately thereafter, the photosensitive member surface was cascaded by a positive-chargeable developer (containing toner and carrier), whereby a good toner image was obtained on its surface.

EXAMPLE 31

A photosensitive member was prepared and a toner image was formed, in the same manner as in Example 30 except that the same charge transport layer as of Example 2 was formed in place of the charge transport layer of Example 1. The results were similar to those of Example 30.

What we claim is:

1. An electrophotographic photosensitive member having a layer containing at least one compound represented by the following formula (I):

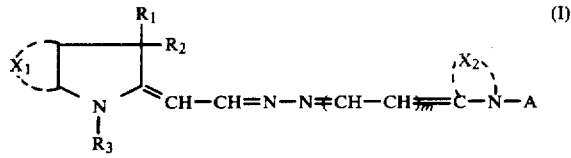

wherein X₁ is a residue necessary for completing a substituted or unsubstituted aromatic hydrocarbon ring; X₂ is a residue necessary for completing a substituted or unsubstituted heterocyclic ring; R₁, R₂, R₃, and A each is hydrogen or alkyl, aralkyl, or aryl, substituted or unsubstituted; and m is 0 or 1.

2. An electrophotographic photosensitive member of claim 1 wherein the compound represented by formula (I) is a compound represented by the following formula (1):

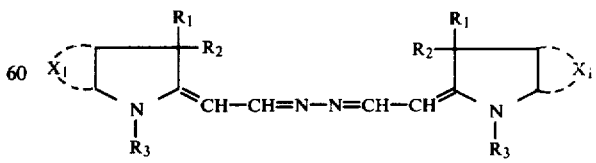

wherein X₁ is a residue necessary for completing a substituted or unsubstituted aromatic hydrocarbon ring and R₁, R₂, and R₃ each is alkyl, aralykyl, or aryl, substituted or unsubstituted.

3. An electrophotographic photosensitive member of claim 2, wherein $X_1$ in formula (1) is a residue necessary for completing a benzene or naphthalene ring substituted or unsubstituted.

4. An electrophotographic photosensitive member of claim 1, wherein the compound represented by formula (I) is a compound represented by the following formula (2):

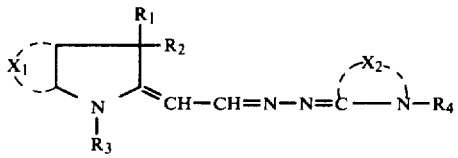

(2)

wherein $X_1$ is a residue necessary for completing a substituted or unsubstituted aromatic hydrocarbon ring, $X_2$ is a residue necessary for completing a substituted or unsubstituted heterocyclic ring, and $R_1$, $R_2$, $R_3$, and $R_4$ each is hydrogen or alkyl, aralkyl, or aryl, substituted or unsubstituted.

5. An electrophotographic photosensitive member of claim 4, wherein $X_1$ in formula (2) is a residue necessary for completing a benzene or naphthalene ring substituted or unsubstituted.

6. An electrophotographic photosensitive member of claim 4, wherein $X_2$ in formula (2) is a residue necessary for completing a nitrogen-containing 5- or 6-membered heterocyclic ring substituted or unsubstituted.

7. An electrophotographic photosensitive member of claim 6, wherein said nitrogen-containing 5-membered heterocyclic ring substituted or unsubstituted is a substituted or unsubstituted ring of thiazoline, thiazole, benzothiazole, naphthothiazole, oxazoline, oxazole, benzoxazole, or naphthoxazole.

8. An electrophotographic photosensitive member of claim 6, wherein said nitrogen-containing 6-membered heterocyclic ring substituted or unsubstituted is a substituted or unsubstituted quinoline ring.

9. An electrophotographic photosensitive member of claim 1, which has a charge generation layer and a layer containing at least one compound represented by formula (I).

10. An electrophotographic photosensitive member of claim 9, said charge generation layer contains a charge-generating material selected from the group consisting of selenium, selenium-tellurium, selenium-arsenic, cadmium sulfide, amorphous silicon, pyrylium dyes, thiopyrylium dyes, triarylmethane dyes, thiazine dyes, cyanine dyes, phthalocyanine pigments, perylene pigments, indigo pigments, thioindigo pigments, quinacridone pigments, squaric acid pigments, azo pigments, and polycyclic quinone pigments.

11. An electrophotographic photosensitive member of claim 10, wherein said charge generation layer contains an azo pigment and a binder.

12. An electrophotographic photosensitive member of claim 11, wherein said azo pigment is a disazo pigment.

13. An electrophotographic photosensitive member of claim 10, wherein said charge generation layer comprises amorphous silicon.

14. An electrophotographic photosensitive member of claim 9, wherein the layer containing at least one compound represented by formula (I) is laid on the upper side of the charge generation layer.

15. An electrophotographic photosensitive member of claim 14, said charge generation layer contains a disazo pigment and a binder.

16. An electrophotographic photosensitive member of claim 14, wherein said charge generation layer comprises amorphous silicon.

* * * * *